United States Patent
Naruse et al.

(10) Patent No.: US 11,701,798 B2
(45) Date of Patent: Jul. 18, 2023

(54) PNEUMATIC TIRE AND METHOD OF MANUFACTURING SAME

(71) Applicant: The Yokohama Rubber Co., LTD., Tokyo (JP)

(72) Inventors: Masahiro Naruse, Hiratsuka (JP); Takashi Hoshiba, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 382 days.

(21) Appl. No.: 16/646,540

(22) PCT Filed: Sep. 10, 2018

(86) PCT No.: PCT/JP2018/033451
§ 371 (c)(1),
(2) Date: Mar. 11, 2020

(87) PCT Pub. No.: WO2019/050029
PCT Pub. Date: Mar. 14, 2019

(65) Prior Publication Data
US 2020/0276735 A1    Sep. 3, 2020

(30) Foreign Application Priority Data
Sep. 11, 2017   (JP) .................................. 2017-174081

(51) Int. Cl.
*B29C 33/58*    (2006.01)
*B29C 33/64*    (2006.01)
(Continued)

(52) U.S. Cl.
CPC .............. *B29C 33/58* (2013.01); *B29C 33/64* (2013.01); *B29C 35/02* (2013.01); *B29C 73/16* (2013.01); *B29D 30/0601* (2013.01)

(58) Field of Classification Search
None
See application file for complete search history.

(56) References Cited

U.S. PATENT DOCUMENTS

| | | |
|---|---|---|
| 4,840,742 A | 6/1989 | Hoffman |
| 4,889,677 A | 12/1989 | Hashimoto et al. |
| | (Continued) | |

FOREIGN PATENT DOCUMENTS

| | | | |
|---|---|---|---|
| CN | 1547533 | 11/2004 | |
| CN | 104725885 A | * 6/2015 | ........... B29C 73/163 |
| | (Continued) | | |

OTHER PUBLICATIONS

Hasimoto JPH06339927 English Translation 1994 (Year: 1994).*

(Continued)

*Primary Examiner* — Jacob T Minskey
*Assistant Examiner* — Adrien J Bernard
(74) *Attorney, Agent, or Firm* — Thorpe North & Western LLP (57) ABSTRACT

A pneumatic tire is vulcanized using a bladder provided with a coating layer formed of a release agent, and includes a sealant layer disposed on an inner surface of a tread portion in a tire circumferential direction. The amount of silicon of the release agents detected in at least a placement region of the sealant layer by fluorescence X-ray analysis is from 0.1 wt. % to 10.0 wt. %.

20 Claims, 4 Drawing Sheets

(51) Int. Cl.
    *B29C 35/02*     (2006.01)
    *B29C 73/16*     (2006.01)
    *B29D 30/06*     (2006.01)

(56)           References Cited

U.S. PATENT DOCUMENTS

| | | |
|---|---|---|
| 2004/0238090 A1 | 12/2004 | Ueda et al. |
| 2017/0291379 A1 | 10/2017 | Yukawa et al. |
| 2017/0297281 A1 | 10/2017 | Yukawa et al. |
| 2017/0305210 A1 | 10/2017 | Yukawa et al. |
| 2018/0036917 A1 | 2/2018 | Inokuchi et al. |
| 2018/0117974 A1* | 5/2018 | Jacob .................... B60C 19/002 |
| 2018/0200972 A1 | 7/2018 | Yukawa et al. |
| 2018/0200976 A1 | 7/2018 | Yukawa et al. |
| 2018/0200977 A1 | 7/2018 | Yukawa et al. |
| 2018/0207998 A1 | 7/2018 | Yukawa et al. |

FOREIGN PATENT DOCUMENTS

| | | | | |
|---|---|---|---|---|
| CN | 106715160 A | * | 5/2017 | ............. B29C 73/22 |
| DE | 11 2017 007 017 T5 | | 10/2019 | |
| JP | S62-275711 | | 11/1987 | |
| JP | S63-277299 | | 11/1988 | |
| JP | H06339927 | * | 12/1994 | ............ B29C 33/02 |
| JP | 2003-080909 | | 3/2003 | |
| JP | 2008-044574 | | 2/2008 | |
| JP | 4410753 | | 2/2010 | |
| JP | 2010-221505 | | 10/2010 | |
| JP | 2015-107690 | | 6/2015 | |
| JP | 2017-087739 | | 5/2017 | |
| WO | WO 03/020539 | | 3/2003 | |
| WO | WO 2016/060229 | | 4/2016 | |
| WO | WO 2016/060234 | | 4/2016 | |
| WO | WO 2016/060235 | | 4/2016 | |
| WO | WO 2016/060236 | | 4/2016 | |
| WO | WO 2016/060239 | | 4/2016 | |
| WO | WO 2016/060244 | | 4/2016 | |
| WO | WO 2016/060247 | | 4/2016 | |
| WO | WO 2016/132834 | | 8/2016 | |

OTHER PUBLICATIONS

Satoshi CN1547533A English Translation 2004 (Year: 2004).*
Yukawa CN 106715160 English Translation 2017 (Year: 2017).*
Chan Wai Ming CN104725885A English Translation 2015 (Year: 2015).*
International Search Report for International Application No. PCT/JP2018/033451 dated Jun. 11, 2018, 4 pages, Japan.

* cited by examiner

PNEUMATIC TIRE AND METHOD OF MANUFACTURING SAME

TECHNICAL FIELD

The present technology relates to a pneumatic tire and a method of manufacturing the same and more particularly to a pneumatic tire and a method of manufacturing the same that can provide air retention properties and adhesiveness of a sealant layer in a compatible manner without deterioration in tire productivity by bonding a sealant layer to a tire inner surface with a release agent adhered thereto.

BACKGROUND ART

A pneumatic tire having puncture sealing properties has been proposed in which a sealant layer formed of an adhesive sealant is disposed in a region of a tire inner surface, corresponding to a tread portion (e.g., Japan Unexamined Patent Publication No. 2003-080909). This kind of pneumatic tire provided with a sealant layer is configured such that when a foreign material such as a nail or the like penetrates into a tread portion, an adhesive sealant sticks to the foreign material so that the adhesive sealant is guided into a puncture hole when the foreign material falls out, thus exerting a sealing effect.

When a green tire is vulcanized using a bladder, the bladder readily adheres to an inner surface of the green tire. Thus, a release agent is applied to the inner surface of the green tire to prevent the green tire and the bladder from adhering to each other. Such a case may cause a problem in that when a sealant layer is disposed on a tire inner surface, the tire inner surface to which a release agent is adhered and the sealant layer have poor adhesiveness therebetween. In this case, the sealant layer may easily peel off.

In light of this, a method has been proposed in which a release agent is applied to an inner surface of a green tire, and buffing is performed on the tire inner surface after the green tire is vulcanized to remove the release agent (e.g., Japan Patent No. 4410753). Unfortunately, performing such buffing causes the gauge of an inner liner to be also thinned, so that there is a problem in that air retention properties deteriorate. Additionally, a method has been proposed in which a film is preliminarily bonded to an inner surface of a green tire and a release agent is applied to the inner surface of the green tire with the film bonded thereto, and then the film is peeled off after the green tire is vulcanized to remove the release agent (e.g., Japan Unexamined Patent Publication No. 2015-107690). Unfortunately, this method requires a step of peeling off the film after vulcanization, thus increasing manufacturing time. Thus, there is a problem in that tire productivity deteriorates. Other methods have also been proposed in which a tire inner surface to which a release agent is adhered is cleaned, however, such methods have a problem in that the release agent cannot be sufficiently removed and tire productivity is poor.

SUMMARY

The present technology provides a pneumatic tire and a method of manufacturing the same that can provide air retention properties and adhesiveness of a sealant layer in a compatible manner without deteriorating tire productivity by bonding a sealant layer to a tire inner surface with a release agent adhered thereto.

A pneumatic tire according to an embodiment of the present technology is a pneumatic tire vulcanized using a bladder provided with a coating layer formed of a release agent, the pneumatic tire comprising:

a sealant layer disposed on an inner surface of a tread portion in a tire circumferential direction;

an amount of silicon of the release agent detected in at least a placement region of the sealant layer by fluorescence X-ray analysis being from 0.1 wt. % to 10.0 wt. %.

A method of manufacturing a pneumatic tire according to an embodiment of the present technology is a method for vulcanizing a green tire using a bladder provided with a coating layer formed of a release agent, the method comprising:

disposing a sealant layer on an inner surface of a tread portion of a vulcanized pneumatic tire, the sealant layer being disposed in a placement region in a tire circumferential direction;

an amount of silicon of the release agent detected in at least the placement region of the sealant layer by fluorescence X-ray analysis being from 0.1 wt. % to 10.0 wt. %.

In an embodiment of the present technology, performing vulcanization using the bladder provided with the coating layer formed of the release agent enables the amount of silicon of the release agent transferred to at least the placement region of the sealant layer to be from 0.1 wt. % to 10.0 wt. %. When a trace amount of release agents is attached to the tire inner surface as described above, the release agent inhibits the permeation of air from the tire inner surface to improve air retention properties while adhesiveness between the tire inner surface and the sealant layer is sufficiently ensured. Additionally, according to the embodiment of the present technology, tire productivity is not deteriorated, unlike when buffing is performed on a tire inner surface, when a film is bonded to a tire inner surface, or when a tire inner surface is cleaned, as in the related art. As a result, the air retention properties and the adhesiveness of the sealant layer can be achieved in a compatible manner without deteriorating the tire productivity.

In the present technology, the sealant layer preferably comprises butyl and/or natural rubber. This enables improving adhesiveness of the sealant layer, or suppressing deformation of the sealant layer.

In an embodiment of the present technology, the sealant layer has a sheet-like shape extending in the tire circumferential direction, and the sealant layer preferably has a thickness of from 0.5 mm to 5.0 mm. This enables preventing deterioration in rolling resistance while ensuring puncture sealing properties.

In an embodiment of the present technology, the sealant layer is preferably disposed with its lateral center positioned within a range of ±10 mm with respect to a tire equator. Disposing the sealant layer as described above does not deteriorate tire uniformity. In particular, the sealant layer is more preferably disposed with its lateral center positioned within a range of ±5 mm with respect to the tire equator.

In an embodiment of the present technology, the sealant layer preferably has a half width that is 100% or greater of a half width of a belt layer having a minimum width, and is 105% or less of a half width of a belt layer having a maximum width. This enables vibrations to be suppressed even when the sealant layer flows while ensuring puncture sealing properties in a lower portion of the belt layer.

In an embodiment of the present technology, a step of forming the coating layer on the bladder preferably has a coating time t (hour) and a temperature T (° C.) of the coating layer that satisfy conditions, $t \geq 0.0001T^2 - 0.07T + 9$, and $T \leq 180°$ C. This enables the time for coating the bladder having the coating layer with the release agent to be shortened and enables shortening of the lifespan of the bladder to be prevented.

In an embodiment of the present technology, when the sealant layer is disposed on a tire inner surface, a sealant extruded from a die is preferably disposed bonded directly to the tire inner surface by compression bonding. This enables tire productivity to be increased and leads the sealant layer to a stabilized shape.

In an embodiment of the present technology, when the sealant layer is disposed on a tire inner surface, a sealant in a string-like shape is preferably disposed applied in a continuous spiral form. This enables disposing the sealant without any gaps and increasing tire productivity.

DETAILED DESCRIPTION

Figure 1:
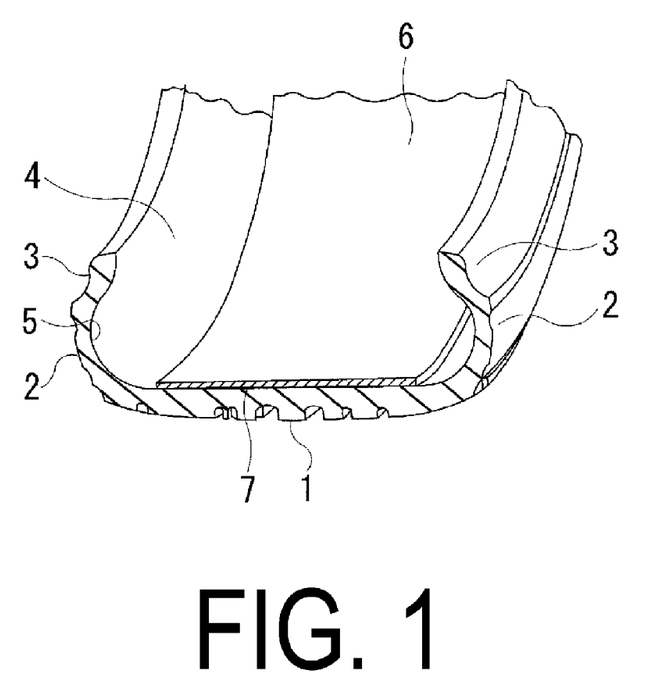
FIG. 1 is a perspective cross-sectional view illustrating a pneumatic tire according to an embodiment of the present technology.
Figure 2:
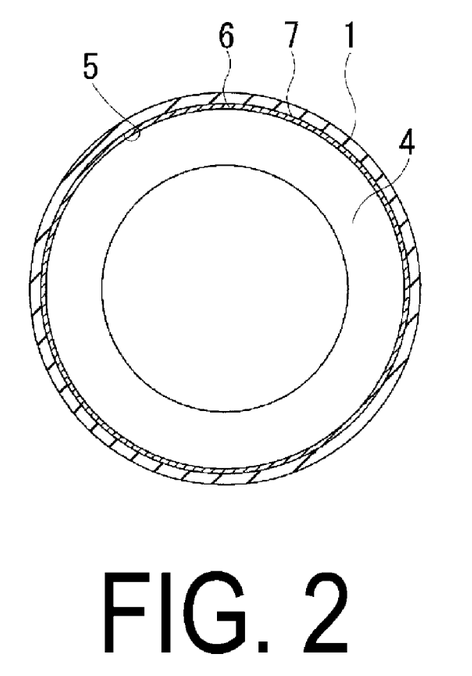
FIG. 2 is a cross-sectional view taken along an equator line of a pneumatic tire according to an embodiment of the present technology.

Configurations of embodiments of the present technology will be described in detail below with reference to the accompanying drawings. FIGS. 1 to 4 each illustrate a pneumatic tire according to an embodiment of the present technology. In FIGS. 1 and 2, the pneumatic tire according to the present embodiment includes an annular tread portion 1 extending in a tire circumferential direction, a pair of sidewall portions 2 disposed on both sides of the tread portion 1, and a pair of bead portions 3 disposed inward of the respective sidewall portions 2 in a tire radial direction. A sealant layer 6 is adhered to a cavity portion 4 surrounded by the tread portion 1, the sidewall portions 2, and the bead portions 3. The sealant layer 6 is disposed in a region of a tire inner surface 5, corresponding to the tread portion 1.

The sealant layer 6 is formed of an adhesive sealant. Any adhesive composition can be used for the sealant. Using such a sealant enables the sealant layer 6 to be adhered to the tire inner surface 5 via the adhesiveness of the sealant.

Figure 3:
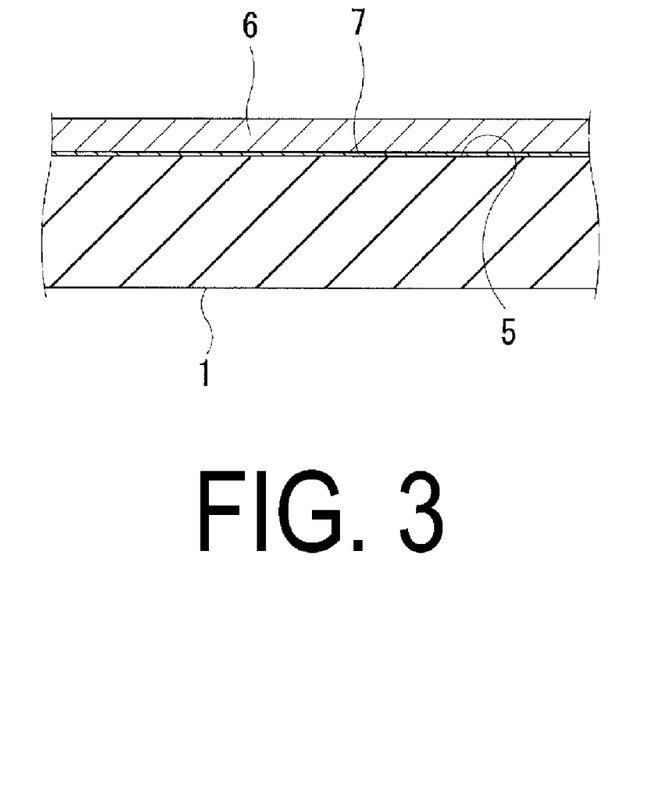
FIG. 3 is a cross-sectional view illustrating an enlarged portion of a pneumatic tire according to an embodiment of the present technology.

As illustrated in FIG. 3, in the pneumatic tire described above, the sealant layer 6 and a transfer layer 7 of a release agent are layered on the tire inner surface 5 from the radially inward side in the order listed above. The transfer layer 7 of the release agent is formed by vulcanizing a green tire using a bladder provided with a coating layer formed of the release agent to transfer the release agent to the tire inner surface 5 of the vulcanized pneumatic tire. The release agent is transferred in a scattered manner as opposed to being transferred to the entire surface of the tire inner surface 5.

The release agent on an inner surface of the tread portion 1 has an amount of silicon of from 0.1 wt. % to 10.0 wt. % at least in a placement region of the sealant layer 6 on the tire inner surface 5. In an embodiment of the present technology, to define the amount of the release agent on the inner surface of the tread portion 1, the amount of silicon that is a main component of a typical release agent serves as an index. The amount of silicon can be detected using fluorescence X-ray analysis. While the fluorescence X-ray analysis generally includes a fundamental parameters method (FP method) and a calibration curve method, the FP method is employed in an embodiment of the present technology. To measure the amount of release agent (silicon), sheet samples are obtained by peeling off a carcass layer and an inner liner layer at a plurality of places (e.g., a total of seven places, four places in the tire circumferential direction and three places in the tire lateral direction) of the pneumatic tire described above (the sheet samples each having dimensions of a width of 70 mm and a length of 100 mm). The sheet samples are used to extract a total of five measurement samples of four corners and one central portion (the measurement samples each having dimensions of a width of from 13 mm to 15 mm, and a length of from 35 mm to 40 mm) from each of the sheet samples. Then, the amount of release agent is measured using a fluorescence X-ray analyzer for each the measurement samples. Next, the amount of release agent for each of the sheet samples is calculated by finding the average of the measurement values of the five measurement samples for each of the sheet samples, and the calculated values each fall within the range of from 0.1 wt. % to 10.0 wt. %. In addition, fluorescent x-ray particles each have unique energy proportional to an atomic number, so that an element can be identified by measuring this unique energy. Specifically, silicon has unique energy of 1.74±0.05 keV. The release agent (silicon) has a number of fluorescent X-ray particles (X-ray intensity) within the range of from 0.1 cps/μA to 1.5 cps/μA.

Examples of components that can be compounded in the transfer layer 7 formed of the release agent include those containing a silicone component as an active ingredient. Examples of the silicone component include organopolysiloxanes, such as dialkylpolysiloxane, alkylphenylpolysiloxane, alkylaralkylpolysiloxane, 3,3,3-trifluoropropylmethylpolysiloxane, and the like. Examples of dialkylpolysiloxane include dimethylpolysiloxane, diethylpolysiloxane, methylisopropylpolysiloxane, and methyldodecylpolysiloxane. Examples of alkylphenylpolysiloxane include methylphenylpolysiloxane, a dimethylsiloxane-methylphenylsiloxane copolymer, and a dimethylsiloxane-diphenylsiloxane copolymer. Examples of alkylaralkylpolysiloxane include methyl (phenylethyl) polysiloxane, and methyl (phenylpropyl) polysiloxane. One type of these organopolysiloxanes may be used, or two or more types thereof may be used in combination.

When vulcanization using the bladder provided with the coating layer formed of the release agent is performed as described above, the amount of silicon in the release agent transferred to at least the placement region of the sealant layer 6 can be set to from 0.1 wt. % to 10.0 wt. %. When a trace amount of release agent is adhered to the tire inner surface 5 in this manner, adhesiveness between the tire inner surface 5 and the sealant layer 6 can be sufficiently ensured and air retention properties are improved by the release agent inhibiting the permeation of air from the tire inner surface 5. When the amount of silicon of the release agent in the placement region of the sealant layer 6 is less than 0.1 wt. %, improvement in air retention properties cannot be achieved. When the amount thereof is greater than 10.0 wt. %, the adhesiveness of the sealant layer 6 deteriorates and sufficient durability cannot be obtained.

Additionally, tire productivity is not deteriorated, unlike when buffing is performed on a tire inner surface, when a film is bonded to a tire inner surface, or when a tire inner surface is cleaned, as in the related art. As a result, the air retention properties and the adhesiveness of the sealant layer 6 can be achieved in a compatible manner without deteriorating the tire productivity. In contrast, when the release agent adhered to the tire inner surface is removed by the method described above in the related art, working time for each step is added. Thus, tire productivity is decreased compared to the case in which the sealant layer is disposed with the release agent adhered as in an embodiment of the present technology.

In the pneumatic tire described above, the sealant layer 6 preferably includes butyl and/or natural rubber. In particular, impermeable rubber used in the inner liner has good compatibility with butyl, thus the sealant layer 6 more preferably contains butyl from the perspective of adhesiveness. In contrast, natural rubber is strong, so that deformation of the sealant layer 6 can be suppressed even when fluidization of the sealant occurs due to heat generated during running. When the sealant layer 6 is formed in this manner, adhesiveness of the sealant layer 6 can be improved, or deformation of the sealant layer 6 can be suppressed.

The sealant layer 6 has a sheet-like shape extending in the tire circumferential direction, and the sealant layer 6 may have a thickness of from 0.5 mm to 5.0 mm. This enables preventing deterioration in rolling resistance while ensuring puncture sealing properties. When the sealant layer 6 has a thickness less than 0.5 mm, puncture sealing properties cannot be sufficiently ensured. When the sealant layer 6 has a thickness more than 5.0 mm, the sealant layer 6 increases in weight, and the sealant layer 6 is likely to generate heat, and thus rolling resistance tends to deteriorate. The thickness of the sealant layer 6 described above is an average value of thicknesses measured at three positions including positions on both outer sides in a width direction from a lateral center position of the sealant layer 6, the positions defining a width of 40% of the entire width of the sealant layer, and the lateral center position of the sealant layer 6.

The sealant layer 6 is preferably disposed with its lateral center positioned within a range of ±10 mm with respect to a tire equator, and is more preferably within a range of ±5 mm with respect to the tire equator. Disposing the sealant layer 6 in this manner does not decrease tire uniformity.

Figure 4:
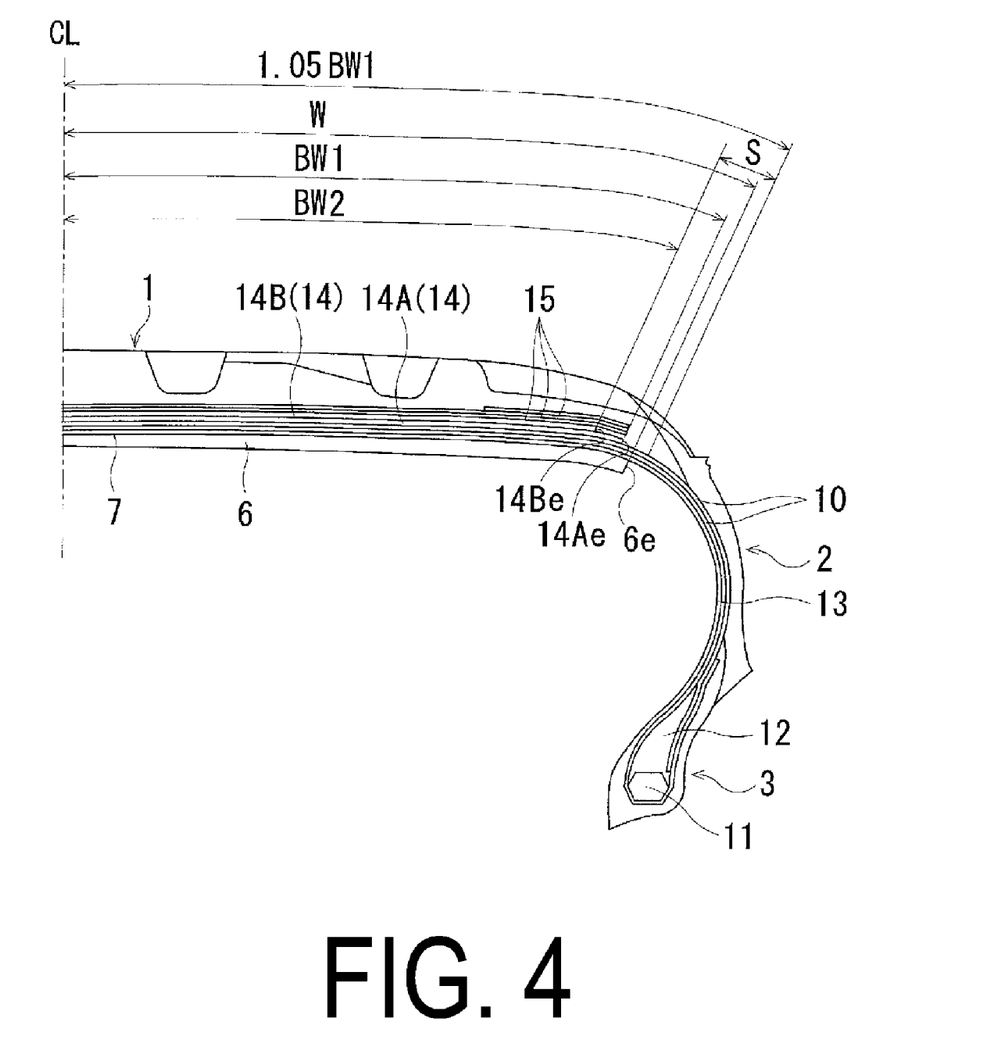
FIG. 4 is a meridian cross-sectional view illustrating a modified example of a pneumatic tire according to an embodiment of the present technology.

FIG. 4 illustrates a modified example of a pneumatic tire according to an embodiment of the present technology. The pneumatic tire illustrated in FIG. 4 is formed in an axisymmetric manner with respect to the tire equator CL. In FIG. 4, at least one carcass layer 10 (two layers in FIG. 4) is mounted between a pair of bead portions 3, 3. The carcass layer 10 includes a plurality of carcass cords oriented in the tire radial direction, and an organic fiber cord is preferably used for the carcass cords. The carcass cords of the carcass layer 10 are disposed at an angle set within a range from 20° to 45° with respect to the tire circumferential direction, for example. The carcass layer 10 is covered with rubber. The carcass layer 10 is turned up around a bead core 11 disposed in each of the bead portions 3 from the tire inner side to the tire outer side. A bead filler 12 having a triangular cross-sectional shape is disposed on a tire outer circumferential side of each of the bead cores 11. Furthermore, an inner liner layer 13 is disposed in a region between the pair of bead portions 3, 3 on a tire inner surface.

The tread portion 1 includes a plurality of belt layers 14 (two layers in FIG. 4) embedded on a tire outer circumferential side of the carcass layer 10. The belt layers 14 each include a plurality of reinforcing cords that are inclined with respect to the tire circumferential direction, with the reinforcing cords of the different layers arranged in a crisscross manner. In the belt layers 14, the inclination angle of the reinforcing cords with respect to the tire circumferential direction ranges from, for example, 10° to 40°. Steel cords are preferably used as the reinforcing cords of the belt layers 14. To improve high-speed durability, at least one belt cover layer 15, formed by arraying the reinforcing cords at an angle of 5° or less with respect to the tire circumferential direction, for example, is disposed on a tire outer circumferential side of the belt layers 14. The belt cover layer 15 preferably has a jointless structure in which a strip material made from at least a single reinforcing cord laid out and covered with rubber is wound continuously in the tire circumferential direction. Also, the belt cover layer 15 may be disposed so as to cover the belt layer 14 in the width direction at all positions, or can be disposed to cover only the edge portions of the belt layer 14 to the outside in the width direction. Organic fiber cords of nylon, aramid, or the like are favorably used as the reinforcing cords of the belt cover layer 15.

The belt layers 14 illustrated in FIG. 4 include a first belt layer 14A positioned radially inward of the tread portion 1 and a second belt layer 14B positioned radially outward of the first belt layer 14A. The first belt layer 14A is set to have a half width BW1 larger than a half width BW2 of the second belt layer 14B, so that the first belt layer 14A has a maximum width and the second belt layer 14B has a minimum width in the belt layers 14. At this time, the sealant layer 6 is set to have a half width W that is 100% or greater of the half width BW2 being the minimum width of the belt layers 14 (the second belt layer 14B), and that is 105% or less of the half width BW1 being the maximum width of the belt layers 14 (the first belt layer 14A). That is, the sealant layer 6 has an end 6e that is present in a region S between a lateral position of an end 14Be of the belt layer 14 with the minimum width and a lateral position having a width of 105% of the maximum width at an end 14Ae of the belt layer 14.

When the sealant layer 6 is set to have the half width W appropriate to the half width BW of the belt layers 14, puncture sealing properties in a lower portion of the belt layers 14 can be sufficiently ensured, and vibrations caused by an offset of the sealant layer 6 can be suppressed even when the sealant layer 6 flows during running. When the sealant layer 6 has the half width W less than 100% of the half width BW2 being the minimum width of the belt layers 14, the puncture sealing properties in the lower portion of the belt layers 14 cannot be sufficiently ensured. Meanwhile, when the sealant layer 6 has the half width W more than 105% of the half width BW1 being the maximum width of the belt layers 14, the sealant flows toward a center side of the tread portion 1 due to effects of softening of the sealant due to heat generated during running and a centrifugal force. This may cause vibrations during running.

Next, a method of manufacturing a pneumatic tire, according to an embodiment of the present technology, will be described. When a green tire is vulcanized, a bladder is preliminarily coated with the release agent (preferably by baking coating) to form a coating layer formed of the release agent on an outer surface of the bladder. The step of forming the coating layer on the outer surface of the bladder is performed while the bladder coated with the release agent is stored at 150° C. for one hour, at 90° C. for four hours, or at ambient temperature for eight hours, for example. The step of forming the coating layer on the outer surface of the bladder is performed within a range of from one time to three times. The green tire is vulcanized using the bladder with the coating layer formed as described above. In the vulcanized tire, a sealant layer 6 is then disposed in the tire circumferential direction in a placement region for the sealant layer 6, in a tire inner surface 5 of a tread portion 1.

When vulcanization using the bladder provided with the coating layer formed of the release agent is performed as described above, the amount of silicon in the release agent transferred to at least the placement region of the sealant layer 6 can be set at from 0.1 wt. % to 10.0 wt. %. When a trace amount of release agents is adhered to the tire inner surface 5 in this manner, adhesiveness between the tire inner surface 5 and the sealant layer 6 can be sufficiently ensured while the release agent inhibits the permeation of air from the tire inner surface 5 and improves air retention properties. Additionally, tire productivity is not deteriorated, unlike when buffing is performed on a tire inner surface, when a film is bonded to a tire inner surface, or when a tire inner surface is cleaned, as in the related art. As a result, the air retention properties and the adhesiveness of the sealant layer 6 can be achieved in a compatible manner without deteriorating the tire productivity.

In particular, the step of forming the coating layer on the outer surface of the bladder preferably has a coating time t (hour) and a temperature T (° C.) of the coating layer that satisfy the conditions, $t \geq 0.0001T^2 - 0.07T + 9$, and $T \leq 180°$ C. In addition, while the relationship formula between the coating time t and the temperature T described above is satisfied, the temperature T preferably satisfies a condition, $T \leq 160°$ C., by setting the coating time t within a range from one hour to eight hours. Further, it is more preferable to set the temperature T to 90° C. and the coating time t to four hours, and it is most preferable to set the temperature T to 150° C. and the coating time t to one hour. Satisfying these conditions enables the time for coating the bladder having the coating layer with the release agent to be shortened and enables shortening of the lifespan of the bladder to be prevented. Here, as the temperature T (° C.) increases, the coating layer can be formed in a short time, however, the bladder is likely to deteriorate and shorten in lifespan.

In the method of manufacturing a pneumatic tire described above, when the sealant layer 6 is disposed on the tire inner surface 5, a sealant extruded in a sheet-like shape from a die is preferably disposed in the tire circumferential direction by being bonded directly to the tire inner surface 5 by compression bonding. Accordingly, a layered sealant is disposed on the tire inner surface 5. Forming the sealant layer 6 as described above enables tire productivity to be increased and leads the sealant layer 6 to have a stabilized shape.

Alternatively, when the sealant layer 6 is disposed on the tire inner surface 5, a sealant in a substantially string-like shape is preferably disposed applied in a continuous spiral form. Accordingly, a plurality of substantially string-like sealants is disposed on the tire inner surface 5 by being aligned in the tire lateral direction. Forming the sealant layer 6 as described above enables disposing the sealant without any gaps, and thus increasing tire productivity.

Example

Using a pneumatic tire having a tire size of 255/40R20 and a sealant layer disposed on an inner surface of a tread portion in a tire circumferential direction, tires of Comparative Examples 1 to 5 and Examples 1 to 7 were manufactured under conditions as shown in Tables 1 and 2, including: method for removing release agent; application of release agent to tire inner surface; use of bladder with coating layer formed of release agent upon vulcanization; amount of release agent (silicon) on tire inner surface (wt. %); and a thickness of a sealant layer (mm).

For Comparative Example 1, the release agents were applied to the tire inner surface, and the release agent was not removed. For each of Comparative Examples 2 to 4, the release agents were applied to a tire inner surface, and the release agent was removed after completion of the step of vulcanization. Specifically, the release agents on the tire inner surface were removed by buffing in Comparative Example 2, the release agent on the tire inner surface was removed by peeling off a film preliminarily adhered to the tire inner surface in Comparative Example 3, and the release agents on the tire inner surface were removed by cleaning the tire inner surface in Comparative Example 4.

Tables 1 and 2 each show the amount of release agents (silicon) on a tire inner surface that is acquired by averaging values calculated on the basis of the amount of release agent (silicon) measured at four places in the tire circumferential direction and three places in the tire lateral direction of each test tire after completion of a fabrication step using an energy dispersive fluorescent X-ray analyzer (EDX-720, available from Shimadzu Corporation). The measurement conditions in vacuum were defined as: voltage was 50 kV; current was 100 μA; integration time was 50 sec; and collimator was ø10 mm.

For these test tires, adhesiveness of a sealant layer, air retention properties, tire productivity, puncture sealing properties, and rolling resistance were evaluated according to the following test method, and their results are shown in Tables 1 and 2.

Adhesiveness of Sealant Layer:

The adhesiveness of a sealant layer described here is an evaluation of peeling on an adhesive surface between a tire inner surface and a sealant layer. Each test tire was assembled on a wheel having a rim size of 20×9.0 J, and subjected to a running test on a drum testing machine under conditions in which running speed was 80 km/h, air pressure was 160 kPa, load was 8.5 kN, and running distance was 6480 km. Then, it was visually checked whether there was falling or peeling of a sealant layer. Test results are shown as follows: a case without falling and peeling of a sealant layer is indicated as "Excellent"; a case with peeling of a sealant layer less than ⅛ of the entire sealant layer is indicated as "Good"; a case with peeling of a sealant layer equal to or greater than ⅛ of the entire sealant layer and less than ¼ thereof is indicated as "Fair"; and a case with peeling of a sealant layer equal to or greater than ¼ of the entire sealant layer is indicated as "Poor".

Air Retention Properties:

Each test tire was assembled on a wheel having a rim size of 20×9.0 J and left for 24 hours under conditions where air pressure was 270 kPa, and temperature was 21° C. Then, air pressure was measured for 42 days at an initial air pressure of 250 kPa, and an inclination of air leakage rates from the 15th day to the 42nd day was determined. The evaluation results are expressed as index values using reciprocals of measurement values, with the value of Comparative Example 1 being assigned the value of 100. Larger index values indicate superior air retention properties. When the index value is equal to or greater than "98", the air retention properties is maintained at a conventional level.

Tire Productivity:

For each test tire, fabrication time (minutes) required to fabricate one tire was measured. The evaluation results are expressed as index values using reciprocals of measurement values, with the value of Comparative Example 1 being assigned the value of 100. Larger index values indicate superior tire productivity.

Puncture Sealing Properties:

Each test tire was formed with a puncture hole, and was inflated to a tire internal pressure of 250 kPa under environment at a constant temperature. Then, it was checked whether there was air leakage by measuring the air pressure. The evaluation results are expressed as index values, with the air pressure of 250 kPa being assigned the value of 100. Index values closer to 100 indicate superior puncture sealing properties.

Rolling Resistance:

Each test tire was assembled on a wheel having a rim size of 20×9.0 J, and was inflated to an air pressure of 250 kPa. Then, rolling resistance was measured using a drum testing machine with a drum diameter 1707 mm in accordance with ISO (International Organization for Standardization) specifications. The evaluation results are expressed as index values using reciprocals of measurement values, with the value of Comparative Example 1 being assigned the value of 100. Larger index values indicate lower rolling resistance.

TABLE 1

|  | Comparative Example 1 | Comparative Example 2 | Comparative Example 3 | Comparative Example 4 | Example 1 | Example 2 |
|---|---|---|---|---|---|---|
| Method for removing release agent | — | Buffing | Peeing of film | Cleaning | — | — |
| Application of release agent to tire inner surface | Yes | Yes | Yes | Yes | No | No |
| Use of bladder with coating layer formed of release agent upon vulcanization | No | No | No | No | Yes | Yes |
| Amount of release agent (silicon) on tire inner surface (wt. %) | 45.0 | 0 | 0 | 15.0 | 0.1 | 2.0 |
| Thickness of sealant layer (mm) | 0.4 | 0.4 | 0.4 | 0.4 | 0.4 | 0.4 |
| Adhesiveness of sealant layer | Poor | Excellent | Excellent | Fair | Excellent | Excellent |
| Air retention properties | 103 | 92 | 99 | 103 | 101 | 102 |
| Tire productivity | 100 | 95 | 95 | 95 | 100 | 100 |
| Puncture sealing properties | 98 | 98 | 98 | 98 | 98 | 98 |
| Rolling resistance | 100 | 100 | 100 | 100 | 100 | 100 |

TABLE 2

|  | Example 3 | Comparative Example 5 | Example 4 | Example 5 | Example 6 | Example 7 |
|---|---|---|---|---|---|---|
| Method for removing release agent | — | — | — | — | — | — |
| Application of release agent to tire inner surface | No | No | No | No | No | No |
| Use of bladder with coating layer formed of release agent upon vulcanization | Yes | Yes | Yes | Yes | Yes | Yes |
| Amount of release agent (silicon) on tire inner surface (wt. %) | 10.0 | 11.0 | 2.0 | 2.0 | 2.0 | 2.0 |
| Thickness of sealant layer (mm) | 0.4 | 0.4 | 0.5 | 2.5 | 5.0 | 5.5 |
| Adhesiveness of sealant layer | Good | Fair | Excellent | Excellent | Excellent | Excellent |
| Air retention properties | 103 | 103 | 102 | 102 | 102 | 102 |
| Tire productivity | 100 | 100 | 100 | 100 | 100 | 100 |
| Puncture sealing properties | 98 | 98 | 100 | 100 | 100 | 100 |
| Rolling resistance | 100 | 100 | 100 | 100 | 100 | 98 |

As can be seen from Tables 1 and 2, the pneumatic tires of Examples 1 to 7 each have enhanced adhesiveness of a sealant layer while maintaining air retention properties without deteriorating tire productivity, compared to Comparative Example 1. Additionally, the pneumatic tires of Examples 4 to 6 each have enhanced puncture sealing properties while maintaining rolling resistance, compared to Comparative Example 1. The pneumatic tire of Example 7 was set to have a thickness of the sealant layer that was relatively thick, so that the rolling resistance was deteriorated compared to Comparative Example 1, but the puncture sealing properties were enhanced.

In contrast, Comparative Example 2 has not only deteriorated tire productivity, but also deteriorated air retention properties due to decrease in thickness of a gauge of an inner liner, because of buffing performed on its tire inner surface. Comparative Example 3 has deteriorated tire productivity because a film was adhered to its tire inner surface and the film was peeled off after vulcanization. Comparative Example 4 has deteriorated adhesiveness of a sealant layer because although its tire inner surface was cleaned, release agent on the tire inner surface was not completely removed to cause a relatively large amount of the release agent to remain on the tire inner surface. Comparative Example 5 has an insufficient effect of enhancing adhesiveness of a sealant layer because the amount of the release agent (silicon) on its tire inner surface was increased.

With a tire size of 255/40R20, a green tire was vulcanized using a bladder having a coating layer formed of release agent, and a pneumatic tire was formed by disposing a sealant layer on an inner surface of a tread portion of the vulcanized green tire. Using the pneumatic tire, tires of Examples 8 to 13 were fabricated, in which the amount of the release agent (silicon) on the tire inner surface (wt. %), the coating time t of the coating layer, and the temperature T were set as shown in Table 3. For these test tires, a lifespan of the coating layer was evaluated according to the following test method, and its results are shown in Table 3.

Lifespan of Coating Layer:

Green tires were vulcanized using a bladder provided with a coating layer formed of release agent, and then the number of green tires each vulcanized having the amount of the release agent (silicon) transferred to its tire inner surface, within a range specified in an embodiment of the present technology, was measured. The evaluation results are expressed as index values, with the value of Example 8 being assigned the value of 100. Larger index values indicate superior lifespans of the coating layer.

at the time when the bladder body had the lifespan was evaluated as a lifespan of the coating layer.

The invention claimed is:

1. A pneumatic tire vulcanized using a bladder provided with a coating layer formed of a release agent, the pneumatic tire comprising:
   a sealant layer disposed on an inner surface of a tread portion in a tire circumferential direction; and
   a transfer layer comprising a portion of the release agent transferred from the bladder, the transfer layer being separate and different from the sealant layer and the transfer layer comprising silicon, an amount of the silicon detected in at least a placement region of the sealant layer by fluorescence X-ray analysis being from 0.1 wt. % to 10.0 wt. %.

2. The pneumatic tire according to claim 1, wherein the sealant layer comprises butyl and/or natural rubber.

3. The pneumatic tire according to claim 1, wherein
   the sealant layer has a sheet-like shape extending in the tire circumferential direction, and
   the sealant layer has a thickness of from 0.5 mm to 5.0 mm.

4. The pneumatic tire according to claim 1, wherein the sealant layer is disposed with its lateral center positioned within a range of ±10 mm with respect to a tire equator.

5. The pneumatic tire according to claim 1, wherein the sealant layer has a half width that is 100% or greater of a half width of a belt layer having a minimum width, and is 105% or less of a half width of a belt layer having a maximum width.

6. A method of manufacturing a pneumatic tire for vulcanizing a green tire using a bladder provided with a coating layer formed of a release agent, the method comprising:
   disposing a sealant layer on an inner surface of a tread portion of a vulcanized pneumatic tire, the sealant layer being disposed in a placement region in a tire circumferential direction;
   an amount of silicon of the release agent detected in at least the placement region of the sealant layer by fluorescence X-ray analysis being from 0.1 wt. % to 10.0 wt. %.

7. The method of manufacturing a pneumatic tire according to claim 6, further comprising a step of forming the coating layer on the bladder with a coating time t (hour) and a temperature T (° C.) of the coating layer that satisfy conditions, $t \geq 0.0001T^2 - 0.07T + 9$, and $T \leq 180°$ C.

TABLE 3

|  | Example 8 | Example 9 | Example 10 | Example 11 | Example 12 | Example 13 |
|---|---|---|---|---|---|---|
| Amount of release agent (silicon) on tire inner surface (wt. %) | 10.0 | 5.0 | 2.0 | 1.0 | 0.5 | 0.1 |
| Coating time t (upper row) and temperature T (lower row) of coating layer | 2 hrs 23° C. | 5 hrs 23° C. | 8 hrs 23° C. | 4 hrs 90° C. | 1 hr 150° C. | 30 min 170° C. |
| Lifespan of coating layer | 100 | 102 | 105 | 105 | 105 | 103 |

As can be seen from Table 3, the pneumatic tires of Examples 9 to 13 each have an enhanced lifespan of the coating layer compared to Example 8. Example 13 was evaluated such that because a bladder body had a lifespan shorter than the coating layer due to temperature T set to a relatively high temperature, the number of tires vulcanized 8. The method of manufacturing a pneumatic tire according to claim 6, wherein the sealant layer comprises butyl and/or natural rubber.

9. The method of manufacturing a pneumatic tire according to claim 6, wherein the sealant layer has a sheet-like shape extending in the tire circumferential direction, and the sealant layer has a thickness of from 0.5 mm to 5.0 mm.

10. The method of manufacturing a pneumatic tire according to claim 9, wherein when the sealant layer is disposed on a tire inner surface, a sealant extruded from a die is disposed bonded directly to the tire inner surface by compression bonding.

11. The method of manufacturing a pneumatic tire according to claim 6, wherein when the sealant layer is disposed on a tire inner surface, a sealant in a string-like shape is disposed applied in a continuous spiral form.

12. The method of manufacturing a pneumatic tire according to claim 6, wherein the sealant layer is disposed with its lateral center positioned within a range of ±10 mm with respect to a tire equator.

13. The method of manufacturing a pneumatic tire according to claim 6, wherein the sealant layer has a half width that is 100% or greater of a half width of a belt layer having a minimum width, and is 105% or less of a half width of a belt layer having a maximum width.

14. The pneumatic tire according to claim 2, wherein the sealant layer has a sheet-like shape extending in the tire circumferential direction, and the sealant layer has a thickness of from 0.5 mm to 5.0 mm.

15. The pneumatic tire according to claim 14, wherein the sealant layer is disposed with its lateral center positioned within a range of ±10 mm with respect to a tire equator.

16. The pneumatic tire according to claim 15, wherein the sealant layer has a half width that is 100% or greater of a half width of a belt layer having a minimum width, and is 105% or less of a half width of a belt layer having a maximum width.

17. The method of manufacturing a pneumatic tire according to claim 7, wherein the sealant layer comprises butyl and/or natural rubber.

18. The method of manufacturing a pneumatic tire according to claim 17, wherein the sealant layer has a sheet-like shape extending in the tire circumferential direction, and the sealant layer has a thickness of from 0.5 mm to 5.0 mm.

19. The method of manufacturing a pneumatic tire according to claim 18, wherein when the sealant layer is disposed on a tire inner surface, a sealant extruded from a die is disposed bonded directly to the tire inner surface by compression bonding.

20. The method of manufacturing a pneumatic tire according to claim 17, wherein when the sealant layer is disposed on a tire inner surface, a sealant in a string-like shape is disposed applied in a continuous spiral form.

* * * * *